Oct. 12, 1965  G. A. LATINEN ETAL  3,211,209
APPARATUS FOR CHANGING THE VOLATILE CONTENT
OF VISCOUS MATERIALS
Filed Oct. 16, 1962  3 Sheets-Sheet 2
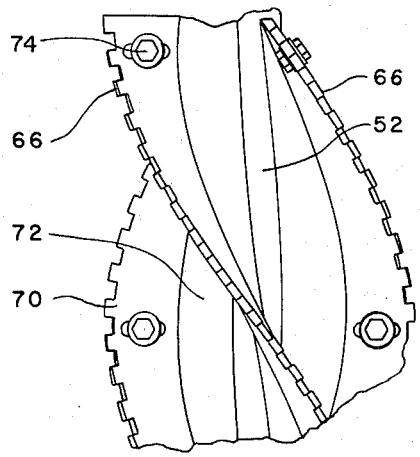
- Fig. II -
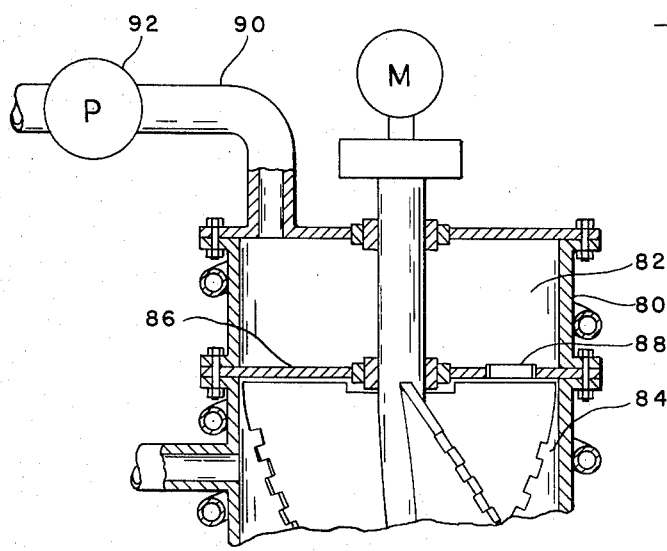
- Fig. III -
GEORGE A. LATINEN
ROBERT H. M. SIMON  INVENTORS.
BY James C. Logomasini
PATENT AGENT.

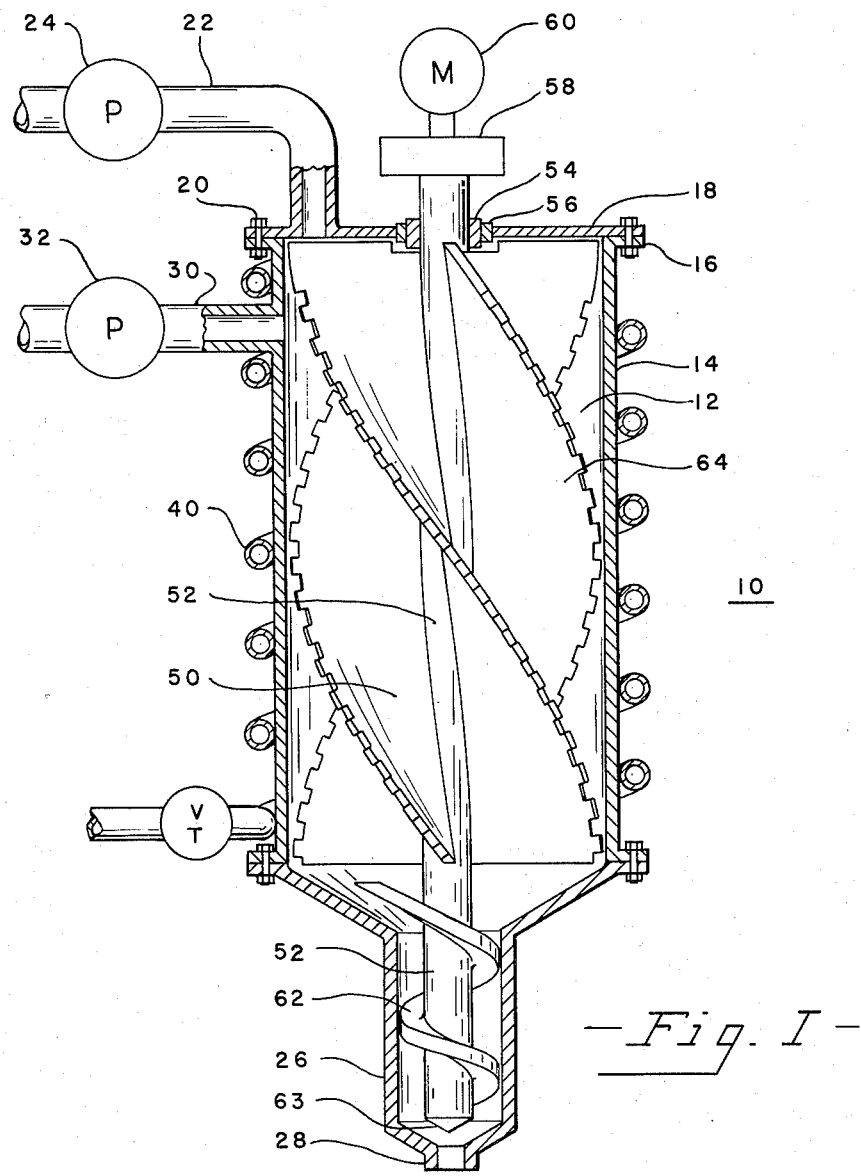
Fig. I
GEORGE A. LATINEN
ROBERT H. M. SIMON
INVENTORS.
BY James C. Logomarini
PATENT AGENT.

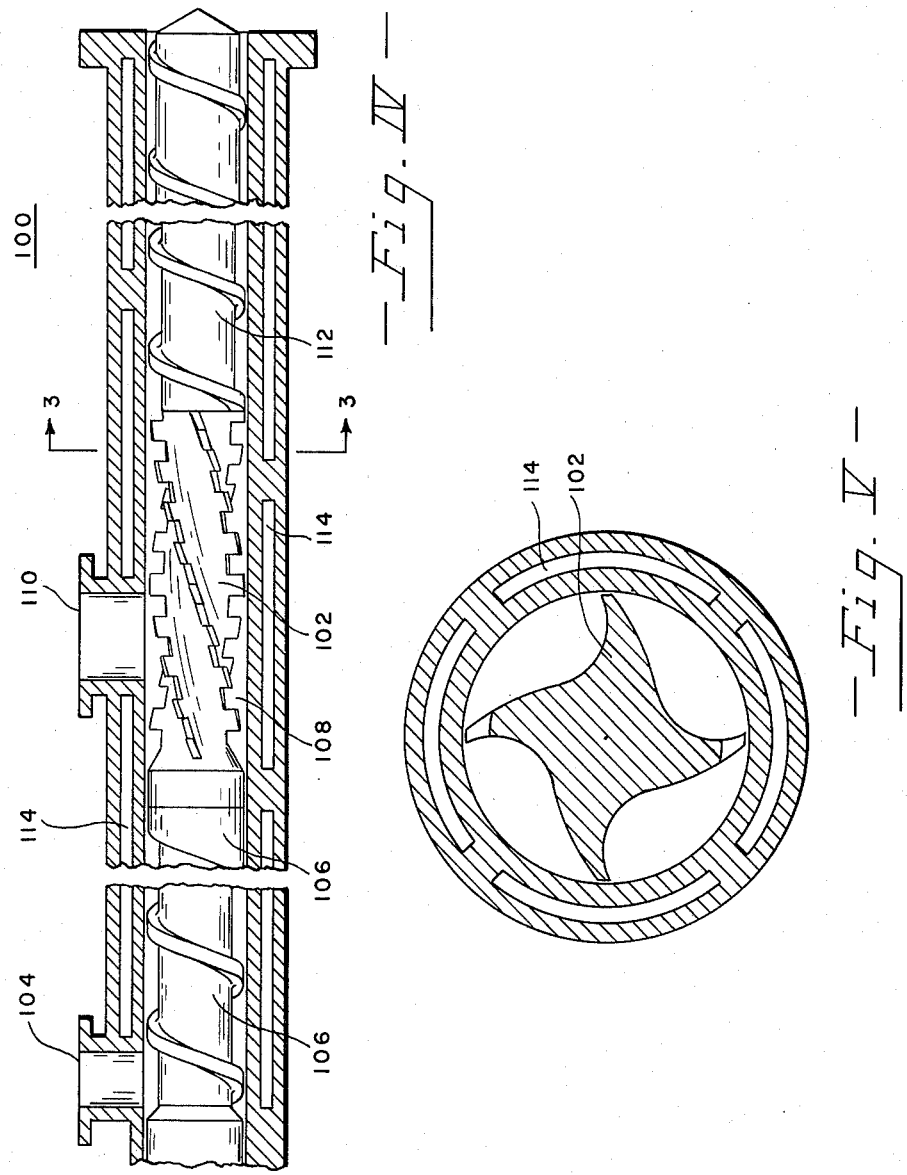

United States Patent Office 3,211,209
Patented Oct. 12, 1965

3,211,209
APPARATUS FOR CHANGING THE VOLATILE CONTENT OF VISCOUS MATERIALS
George A. Latinen, Wilbraham, and Robert H. M. Simon, Longmeadow, Mass., assignors to Monsanto Company, a corporation of Delaware
Filed Oct. 16, 1962, Ser. No. 230,945
7 Claims. (Cl. 159—6)

This application is a continuation-in-part of our copending application, S.N. 801,284, filed March 23, 1959, now Patent 3,067,812.

The present invention is directed to the devolatilization and gaseous absorption of fluid materials, and more particularly, to continuous operations involving changing the volatile content of viscous fluid materials.

Synthetic polymeric materials, to be suitable for use in fabricating operations involving the use of heat, such as molding, extruding and the like, should contain a minimum of volatiles, otherwise the fabricated products evidence poor structure, porosity and other undesirable properties.

Reaction products from polymerization processes, particularly mass and solvent-type, as well as condensation-type polymerizations, contain in addition to polymer, large quantities of volatilizable materials such as residual monomeric components, volatile reaction products, organic solvents and the like. Various methods have been contrived to separate the polymer from these volatilizable materials such as extraction, fractionation and the like. One particular method which is often used is that of violently agitating the mixtures. The turbulence which is created generally effects release of volatile components, which are then vented off from the mass. While this expedient has met with success in fluid mixtures of comparatively low viscosity, i.e., less than 100 poise at operating temperatures, it has been less than successful for devolatilizing or degasifying fluid mixtures of higher viscosities, particularly with regard to continuous operations.

On the other hand, it is often desirable to permit gases and other volatiles to be absorbed by synthetic polymeric materials. One of the more important applications is the absorption of highly volatile materials by synthetic polymeric materials for the subsequent formation of polymeric foam structures. In other applications, gases may be absorbed to effect reaction with the synthetic polymeric materials.

In devising a continuous process for changing the volatile content of viscous fluid materials, with or without reaction, two aspects most prominently reflect on success. The first is the ability to vary the temperature level of the various components and the second is the capability for providing large surface contact or exposure between the reactants.

In the parent application, there is described apparatus for the continuous devolatilization of fluid materials. This apparatus comprises essentially an externally heated chamber and a rotatable member located within the chamber. The rotatable member described in that application is provided with a plurality of radially projecting blades having teeth or serrated edges at their radial extremities. In order to advance the material through the chamber at an optimum rate with maximum surface exposure, the teeth or trailing edges are bent rearwardly to form an angle of 15–75° in the direction of retreat on rotation of said member. In addition, a second embodiment is shown in that application wherein the blades are helically stationed on the rotatable member. In this latter modification the teeth are also bent rearwardly to form an angle of 15–75° in the direction of retreat of rotation of the member. It has now been found that superior results in both material advancement and surface exposure may be had by a helical modification wherein the teeth followed the radial line of the helical blades or ribs rather than bent rearwardly opposite the direction of rotation.

Accordingly, it is a principal object of the present invention to provide apparatus adapted for continuously changing the gaseous and/or volatile content of fluid materials.

Another object of the present invention is to provide apparatus for continuously changing the gaseous and/or volatile content of fluid materials having viscosities greater than 100 poise at operating temperatures.

A further object of the present invention is to provide apparatus for continuously changing the gaseous and/or volatile content of fluid materials having viscosities greater than 100 poise at operating temperatures at high and efficient rates with a minimum of degradation.

Other objects of the invention will in part be obvious and will in part appear hereinafter.

These and other objects of the invention are attained in an apparatus comprising, in combination, an externally temperature-controlled casing defining a chamber and a rotatable member located within said chamber. The chamber is provided with an entry for charging process materials, an exit for discharging process materials and a passageway for the flow of volatiles and gases. The rotatable member comprises a center shaft, rotatably mounted in the chamber, having a plurality of ribs helically extending around the longitudinal axis of said shaft. The ribs are notched at intervals along their peripheral edges and the notches of each rib are staggered or offset when considered with respect to the several ribs. An extruder head is integrated to the exit or discharge end of the chamber. The extruder head comprises an elongated casing defining a lengthwise bore, an extruder screw within said bore secured coaxially to the center shaft and an extrusion orifice at the discharge end of the extruder head. Rotation of the rotatable member and extruder screw is provided by attaching the same to suitable driving means.

For a fuller understanding of the nature and objects of the present invention, reference should be had to the following detailed description taken in connection with the accompanying drawings, in which FIG. I is a side view in section and with parts broken, representing one embodiment of the apparatus for changing the volatile content in viscous materials of the present invention having an extruder head for discharging product, and FIG. II is a side view in section and with parts broken, representing a modified embodiment of a rotatable member featuring an adjustable blade edge for use in devolatilization and gaseous absorption apparatus of the present invention.

FIG. III is a side view in section and with parts broken, representing another embodiment of the apparatus of the present invention having an extruder head for discharging product, and a head casing enclosing a gaseous reservoir.

FIG. IV is a side view in section and with parts broken, representing one embodiment of the apparatus of the present invention having extruder means both for charging and discharging process materials.

FIG. V is a side view in section and with parts broken, taken along the line 3—3 of FIG. IV.

Referring to the drawings, wherein line numbers refer to like parts throughout, initially, FIG. I shows an apparatus 10 of rigid material construction for changing the volatile content in viscous materials. Chamber 12, where the volatile content of the viscous materials will undergo a change, is defined within casing 14. Flange 16 serves to position closure 18 securely at the upper end of casing 14 by means of plurality of bolts 20. Closure 18 is shown provided with a conduit 22 which is tapped through said closure 18 and into the devolatilization and gaseous absorption chamber 12. Pump 24 is provided for the exhaustion or gaseous pressurizing of chamber 12. In other words, if it is desired to increase the volatile content of the viscous materials being processed, pump 24 will be used to feed the volatiles or gases to be absorbed into chamber 12 under pressure. On the other hand, if it is desired to reduce the volatile or gaseous content of the materials being processed, pump 24 will be used to pull the gases and volatiles emanating from the viscous materials out of the chamber by drawing a vacuum upon chamber 12. Discharge of the devolatilized or gaseous absorption products is provided for by provision of an extruder head 26 having an extruder orifice 28. The extrusion head is shown integral to the bottom of casing 14.

In the embodiment shown, charging of the materials to chamber 12 for effecting a change in the volatile content of said materials is had through conduit 30 which is tapped through casing 14 and into said chamber 12. Pump 32 facilitates charging of the process materials into chamber 12. If desired, other suitable charging means may be used. Heat exchange coil 40, located externally of casing 14 serves to provide heat or cooling to at least the outer peripheries of chamber 12.

Rotatable member 50 is positioned along the longitudinal axis of chamber 12. Center shaft 52 of rotatable member 50 extends upwardly from chamber 12 projecting through gasket 54, the latter positioned by means of collar 56 positioned in the center of closure 18. Shaft 52 is gear-connected at its upper end with a variable speed gear box 58 which is in turn driven by motor 60. In this manner variable speed rotation can be imparted to rotatable member 50.

At the opposite or discharge end of chamber 12, the preferred embodiment of rotatable member 50 is provided with an extruder screw which is effected by providing a projection of shaft 52 with a helical flight 62 and a conical tip 63. The use of an extruder head at the discharge end of chamber 12 has the dual advantage of first, contributing to the radial or rotational stabilization of rotatable member 50 and secondly, providing rapid and efficient discharge means for the more heavy viscous fluids thereby eliminating plug-ups or erratic flowing. The extruder screw should be designed to have a capacity greater than the rate of material feed to the apparatus. The principles of such design are well-known to those skilled in the art.

A plurality of ribs 64—64 helically extend around shaft 52. This is also shown in a modified version in FIG. II. Ribs 64—64 have serrated edges or teeth 66—66 along their peripheral edges. The peripheral edges are rounded and machined for close clearance with the inner wall of chamber 12. The spacing of the teeth 66—66 along the edge of the ribs 64—64 is preferably offset or staggered with relation to the teeth on the several ribs. The ribs and center shaft may be of uni-construction as shown in FIGS. IV and V or the ribs may be separately attached by any suitable means to the shaft 52 such as by well bolts, screws, welding, etc. The axial extension of ribs 64—64 may be as great as chamber 12 will allow without interference of the rotation of rotatable member 50.

As previously mentioned, the peripheral edges of the helical ribs 64—64 are serrated or notched to form teeth 66—66. The lead or pitch of the helical ribs may vary preferably between 1 to 25 and more preferably 1 to 10 times the diameter of the rotatable member 52, depending on the number of ribs used and forwarding rate desired. The diameter of the rotatable member is measured normal to the longitudinal axis of the center shaft 52 outwardly to the extent of the peripheral edges of the helical ribs 64—64. If the lead is small, the viscous material advances more slowly at a given rotational speed, thereby increasing the fillage and heat generation, decreasing exposed surface area and, as a result, the rate at which the volatile content will be changed. High fillages have also been found to give a greater degree of axial intermixing of the fluid as well as a channeling-type of flow, thereby further decreasing the devolatilization efficiency. If the lead is large, more ribs can be added to the shaft without restricting the open vapor passages as much as with small leads. If the lead is extremely large, the material is subjected to higher frictional forces resulting in a higher generation of heat. Higher heats, in turn, tend to cause various materials to undergo viscosity degeneration, caking and other detrimental effects. For viscous fluids in the range of $10^2$ to $10^5$ poise viscosity, a lead of 3 to 6 times the diameter of the rotatable member is generally preferable in line with optimum through-put and devolatilization or absorption rates with a minimum of heat generation. The teeth are offset along the individual ribs with respect to the several ribs 64—64. Together these expedients push synthetic polymeric materials along the inner surface of the casing while at the same time exposing maximum surface by the continual reformation of annular furrows. Another important function of the teeth is to produce flow randomization in order to reduce the deleterious channeling tendency under laminar flow conditions.

The tolerance or clearance between the peripheral edges of the teeth 66—66, and the inner wall of chamber 12 should be close (about .002″ to .020″ performs well) in order to prevent process material from eventuating as stagnated wall film, and to provide a high heat transfer coefficient for good temperature control. Variations and tolerance can be exercised depending on the physical properties of the material being processed. An acceptable method for clearance variation is shown in FIG. II wherein an adjustable blade edge 70 is affixed to a rib stub 72 by means of a plurality of set screws 74.

Referring again to FIG. 1, the number of teeth 66—66 and the spacing between said teeth can vary. The deeper and more closely spaced these are, the greater the surface area of the process material wiped onto the inner surface of casing 14 or chamber 12, and consequently more complete change in the volatile content of the viscous material being processed can take place. However, the grooves or gaps between the teeth should not be so deep that the process material will enter in substantial amounts and accumulate in the interior sections formed by the junctions of ribs 64—64 and shaft 52. A depth of ¼ to ⅓ of the radius of chamber 12 approaches the limit. Additionally, the spacing between the teeth 66—66 should be sufficiently wide to allow a given furrow formed by adjacent teeth of an individual rib to retain identity as a furrow until contacted by a tooth 66 of a rib 64 following the rib 64 which formed the furrow. A spacing between the teeth of about 0.2 to 1.0 times the tooth width works well. Tooth widths ranging from about 0.05 of the radius at low fillages to about .25 of the radius at higher fillages have been found to produce good mixing action.

As indicated in FIG. I, the number of ribs 64—64 are preferably four. Some variation in this number can be had. However, since the rate of change taking place within the viscous materials tends to increase only as the square root of the number of ribs, increasing the number of ribs complicates construction and reduces available vapor space with deleterious effects sufficient to offset benefits obtained in increasing the number of ribs.

To advance the material being processed, the rotatable member 50, and more particularly, the edges of ribs 64—64 are rotated at a peripheral speed anywhere from 25 to 5000 or more generally 25 to 1500 feet per minute. The peripheral speed is independent of the size of the chamber 12. The recommended ratio of length versus diameter of chamber 12, ranges between 2:1 to 50:1 and more preferably 2:1 to 10:1. Further variation within this range can be observed in relation to a given process material. Additionally, the speed of advance of the process material can be observed in relation to the L/D ratio of chamber 12 and this in turn can be used to regulate the rate of feed of charging pump 32.

In addition to the peripheral speed at which rotatable member 50 is rotated, the amount of material present in chamber 12 will reflect on the efficiency of apparatus 10. Optimum conditions can be had using between 5% to 30% fillage. While fillage can be greater or less than these amounts, optimum volumetric efficiency and mixing action with adequate vapor space and film surface area of the process material being wiped onto the interior surface of casing 14 lies within these limits.

Heating coil 40 is provided to cause heating of at least the outer periphery of chamber 12. The temperature of the casing 14 and consequently the periphery of 12 can be varied as depending upon the material being processed. Other heating means such as jacketing and the like can also be used.

Referring to FIGS. III–V, alternate embodiments of the invention are shown. In FIG. III, a casing head 80 enclosing a gaseous reservoir 82 is provided to minimize fluctuations or erratic gas flow to or from chamber 84. A divider 86 separates the gaseous reservoir from chamber 84. Divider opening 88 permits passage of gas between chamber 84 and the gaseous reservoir 82. The top of the casing head is provided with conduit 90 which leads to pump means 92 for gaseous pressurizing or evacuating the gaseous reservoir 82.

FIGS. IV and V illustrate an apparatus 100 wherein the notched rotatable member 102 has extruder means attached coaxially both at its intake and discharge ends. Process materials are charged to the apparatus 100 through hopper 104 and are conveyed by extruder screw section 106, under heat and pressure, to chamber 108. Volatiles or gases exit or enter through port 110 located above the horizontally positioned rotatable member 102. Process materials discharging at the advance end of the rotatable member 102 are picked up and advanced to a die section (not shown) by means of extruder screw 112 affixed coaxially to the rotatable member 102. The casing surrounding the rotatable member and coaxially attached extruder screws is provided with channels 114—114 for the circulation of a cooling or heating medium.

A sectional view on the line 3—3 of FIG. IV is shown in FIG. V. This latter figure illustrates more clearly a modified embodiment of the rotatable screw wherein the rib and center portion are uni-constructed or fabricated from a single piece.

Referring again to FIG. I, the apparatus 10 of the present invention can be used to devolatilize, degasify or gasify various process materials which are continuously charged into chamber 12. Operation of charging pump 32, together with gas pump 24, rotation of rotatable member 50 and the circulation of heat-exchange liquid within coil 50 in the manner previously described, will effect devolatilization of the material so charged.

The apparatus of the present invention has particular utility in changing the volatile content of viscous fluids having 100 to 100,000 poise viscosity measured at the operating temperatures. Various polymerized materials, more particularly the reaction products or media resulting from polymerization reactions are within this viscosity range. These include polystyrene, polyethylene and various other polyolefins resulting from condensation reactions such as nylon, phenol-formaldehyde, melamine-formaldehyde, urea-formaldehyde, polycarbonates, etc. It can also be used to good advantage in treating other organic and inorganic materials which are viscous in nature and from which it is desirable to extract or add various gases, solvents and the like.

It will thus be seen that the objects set forth above, among those made apparent from the preceding description, are efficiently attained and, since certain changes may be made in the above apparatus without departing from the scope of the invention, it is intended that all material contained in the above description shall be interpreted as illustrative and not in a limiting sense.

What is claimed is:

1. An apparatus adapted for changing the volatile content of viscous fluids comprising, in combination, an externally temperature-controlled casing defining a chamber, said chamber being provided with an entry for charging viscous fluids, an exit for discharging viscous fluids and a passageway for the flow of volatiles and gases; a rotatable member comprising a center shaft, rotatably mounted in said chamber, having a plurality of ribs helically extending around the longitudinal axis of the center shaft, said ribs having a lead of from 1 to 10 times the diameter of the rotatable member and being notched at intervals along their peripheral edges, the notches of said rib having a maximum depth of ¼ to ⅓ the radius of the chamber; and an extruder head, integrated to the exit of said chamber, comprising an elongated casing defining a lengthwise bore, an extruder screw within said bore secured coaxially to the center shaft at the discharge end of said rotatable member and an extrusion orifice at the discharge end of the extruder head.

2. The apparatus according to claim 1 wherein the notches of each rib are in staggered relationship when considered with respect to those of the several ribs.

3. The apparatus according to claim 1 wherein the clearance between the peripheral edges of the notched ribs and the chamber wall range from .002 to .020 inch.

4. The apparatus according to claim 1 wherein the spacing between the teeth vary between 0.2 to 1.0 times the tooth width.

5. The apparatus according to claim 1 wherein the number of ribs are four.

6. The apparatus according to claim 1 wherein the length of the chamber ranges between 2 to 10 times the chamber diameter.

7. The apparatus according to claim 1 wherein driving means are provided capable of rotating said rotatable member at a peripheral speed of from 25–1500 feet per minute.

References Cited by the Examiner

UNITED STATES PATENTS

| | | | |
|---|---|---|---|
| 1,466,579 | 8/23 | Collver | 159—6 |
| 2,011,055 | 8/35 | Klugh | 159—2 |
| 2,546,381 | 3/51 | Zahm | 159—6 |
| 2,765,490 | 10/56 | Zona | 18—12 |
| 2,812,019 | 11/57 | Rusmussen | 159—49 |
| 2,817,155 | 12/57 | Gilliam et al. | 34—8 |
| 2,857,962 | 10/58 | Rogers | 159—6 X |
| 2,927,634 | 3/60 | Gudheim | 159—6 |
| 2,992,679 | 7/61 | Twaddle | 159—2 |
| 3,023,456 | 3/62 | Palfey | 159—2 |
| 3,067,812 | 12/62 | Latinen et al. | 159—6 |

NORMAN YUDKOFF, *Primary Examiner.*